(12) United States Patent
Sasin et al.

(10) Patent No.: US 10,374,976 B2
(45) Date of Patent: *Aug. 6, 2019

(54) METHOD, APPARATUS AND SYSTEM FOR ADDRESSING RESOURCES

(71) Applicant: Arm Finland OY, Oulu (FI)

(72) Inventors: Szymon Sasin, Oulu (FI); Sampo Ukkola, Oulu (FI); Zachary Shelby, Oulu (FI)

(73) Assignee: ARM FINLAND OY (FI)

( * ) Notice: Subject to any disclaimer, the term of this patent is extended or adjusted under 35 U.S.C. 154(b) by 209 days.

This patent is subject to a terminal disclaimer.

(21) Appl. No.: 15/427,542

(22) Filed: Feb. 8, 2017

(65) Prior Publication Data

US 2018/0227245 A1    Aug. 9, 2018

Related U.S. Application Data

(63) Continuation of application No. 14/944,463, filed on Nov. 18, 2015, now Pat. No. 9,596,190, which is a continuation of application No. 13/721,638, filed on Dec. 20, 2012, now Pat. No. 9,225,660.

(30) Foreign Application Priority Data

Dec. 21, 2011  (FI) ..................... 20116298

(51) Int. Cl.
*H04L 12/911* (2013.01)
*H04L 29/08* (2006.01)

(52) U.S. Cl.
CPC ............. *H04L 47/82* (2013.01); *H04L 67/16* (2013.01); *H04L 67/2814* (2013.01);
(Continued)

(58) Field of Classification Search
CPC ....... H04L 67/288; H04L 67/28; H04L 67/32; H04L 67/2814; H04L 67/2833;
(Continued)

(56) References Cited

U.S. PATENT DOCUMENTS

| 2005/0044430 A1 | 2/2005 | Cheshire |
|---|---|---|
| 2006/0002320 A1 | 1/2006 | Costa-Requena et al. |
| | (Continued) | |

FOREIGN PATENT DOCUMENTS

WO    2011/159985 A1    12/2011

OTHER PUBLICATIONS

Rahman, et al., "Sleeping and Multicast Considerations for CoAP", Dec. 29, 2010, pp. 1-15.
(Continued)

*Primary Examiner* — Ruolei Zong
(74) *Attorney, Agent, or Firm* — Barnes & Thornburg LLP

(57) ABSTRACT

A method and an apparatus for addressing resources, the apparatus having a first interface to communicate with end-points operationally connected to the apparatus using a binary web service, the end-points including one or more resources; a second interface for receiving requests regarding the resources and for responding to the requests; a component for storing information on sleeping end-points which are non-continuously available and storing a request queue for each sleeping end-point; a component for receiving through the second interface a request regarding a sleeping end-point, adding the request to the request queue of the end-point; communicating with a sleeping end-point regarding the requests after receiving through the first interface a queue request from the end-point; and sending through the first interface responses for the resolved requests.

15 Claims, 6 Drawing Sheets

(52) U.S. Cl.
CPC .......... *H04L 67/2833* (2013.01); *H04L 67/02* (2013.01); *H04L 67/125* (2013.01)

(58) Field of Classification Search
CPC ..... H04L 67/2895; H04L 67/16; H04L 67/02; H04L 67/125; H04L 47/82; H04W 28/14; H04W 28/005; G06F 3/067; G06F 17/30902
USPC ......................................................... 709/226
See application file for complete search history.

(56) References Cited

U.S. PATENT DOCUMENTS

| | | | |
|---|---|---|---|
| 2008/0042830 A1* | 2/2008 | Chakraborty | G06K 7/0008 340/540 |
| 2008/0240105 A1* | 10/2008 | Abdallah | H04L 12/66 370/392 |
| 2009/0046610 A1 | 2/2009 | Yamaji | |
| 2009/0172117 A1* | 7/2009 | Bedi | H04W 52/0216 709/206 |
| 2010/0061272 A1 | 3/2010 | Veillette | |
| 2010/0125641 A1* | 5/2010 | Shelby | H04L 67/16 709/206 |
| 2012/0151028 A1* | 6/2012 | Lu | H04W 4/18 709/223 |
| 2012/0271908 A1 | 10/2012 | Luna et al. | |

OTHER PUBLICATIONS

Finland Search Report for Patent Application No. 20116298, dated Sep. 21, 2012.

* cited by examiner

METHOD, APPARATUS AND SYSTEM FOR ADDRESSING RESOURCES

CROSS REFERENCE TO RELATED APPLICATIONS

This patent application is a continuation of U.S. patent application Ser. No. 14/944,463 filed Nov. 18, 2015, entitled METHOD, APPARATUS AND SYSTEM FOR ADDRESSING RESOURCES, which is a continuation of U.S. patent application Ser. No. 13/721,638 filed Dec. 20, 2012, entitled METHOD, APPARATUS AND SYSTEM FOR ADDRESSING RESOURCES, now U.S. Pat. No. 9,225,660 issued Dec. 29, 2015, which claims priority to Finnish Patent Application No. 20116298, filed 21 Dec. 2011, the disclosure of which is incorporated herein by reference in its entirety

FIELD

Disclosed embodiments relate to a method, an apparatus and a system for addressing resources. In particular, disclosed embodiments relate to addressing resources and web services in networks comprising machine-to machine systems.

BACKGROUND

The following description of background art may include insights, discoveries, understandings or disclosures, or associations together with disclosures not known to the relevant art prior to the disclosed embodiments but provided by the disclosed embodiments. Some of such contributions of the disclosed embodiments may be specifically pointed out below, whereas other such contributions of the disclosed embodiments will be apparent from their context.

In modern communication and computer networks, data exchange between programs and computers is a vital element. Different programs, computers and processors exchange data without human intervention. This kind of communication is usually called machine-to-machine (M2M) communications.

An example of a network technology where M2M communication is widely applied is a low-power wireless network, such as an IEEE 802.15.4 based embedded and sensor network. More recently, as machine-to-machine devices have become IP enabled, systems have become more open by using IP as a networking protocol.

Applications running in devices connected to the Internet may need information provided by M2M devices. One problem that relates to low-power wireless networks is accessing M2M end-points which are not continuously connected to the system. For conserving operating power there may be a large number of end-points which spend most of the time in a sleep-mode and enter a wakeup-mode only now and then at perhaps irregular intervals.

SUMMARY

Disclosed embodiments provide a solution for addressing and accessing resources offered by M2M devices.

BRIEF DESCRIPTION OF THE DRAWINGS

Disclosed embodiments are described below, by way of example only, with reference to the accompanying drawings.

DETAILED DESCRIPTION OF THE DISCLOSED EMBODIMENTS

Figure 1:
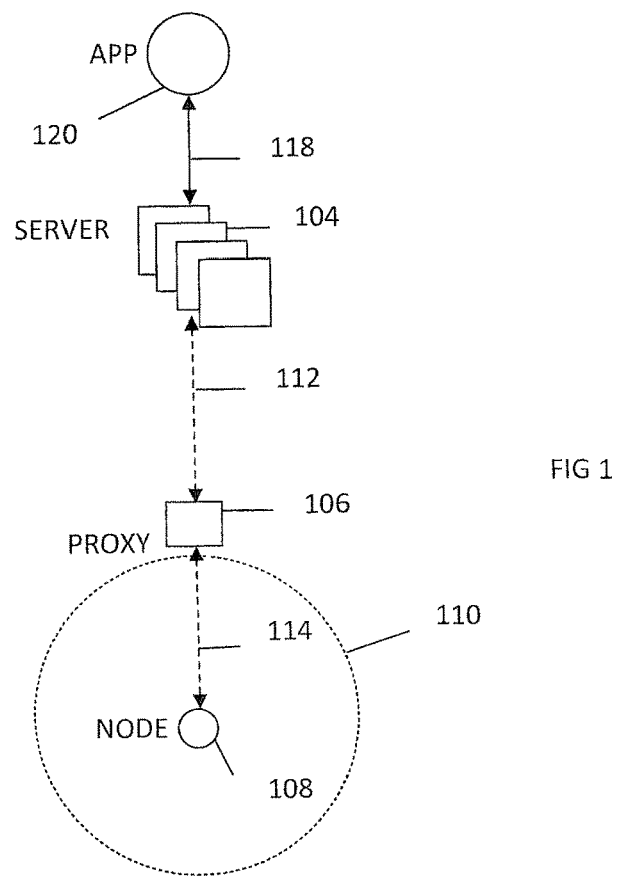
FIG. 1 illustrates an example of a system architecture to which disclosed embodiments may be applied.

A first disclosed embodiment provides an apparatus comprising a first interface to communicate with end-points operationally connected to the apparatus using a binary web service, the end-points comprising one or more resources, the first interface being configured to receive from an end-point a registration comprising information on the address and the resources of the node, and whether the end-point is non-continuously available; a second interface for receiving requests regarding the resources and for responding to the requests; a component for storing information on end-points which are continuously available and on sleeping end-points which are non-continuously available and storing a request queue for each sleeping end-point; a component for receiving through the second interface a request regarding a sleeping end-point, adding the request to the request queue of the end-point; communicating with a sleeping end-point regarding the requests after receiving through the first interface a message from the end-point; and sending through the second interface responses for the resolved requests.

A second disclosed embodiment provides a method comprising one or more resources configured to provide information; a first binary web service interface to communicate with a network element operationally connected to the apparatus using a binary web service, the apparatus being configured to enter a wakeup-mode during predetermined time periods, during which mode communication with the network element is possible, and otherwise be in a sleep-mode, where the sleep-mode time periods are longer than wakeup-mode periods; send the network element a message after entering wake-up mode; receive one or more requests from the network element; and send responses to the network element.

A third disclosed embodiment provides a web service system comprising an apparatus comprising a first interface to communicate with end-points operationally connected to the apparatus using a binary web service, the end-points comprising one or more resources, the first interface being configured to receive from an end-point a registration comprising information on the address and the resources of the node, and whether the end-point is non-continuously available; a second interface for receiving requests regarding the resources and for responding to the requests; a component for storing information on end-points which are continuously available and on sleeping end-points which are non-continuously available and storing a request queue for each sleeping end-point; a component for receiving through the second interface a request regarding a sleeping end-point, adding the request to the request queue of the end-point; communicating with a sleeping end-point regarding the requests after receiving through the first interface a message from the end-point; and sending through the second interface responses for the resolved requests and one or more apparatuses each comprising one or more resources configured to provide information; a first binary web service interface to communicate with a network element operationally connected to the apparatus using a binary web service, the apparatus being configured to enter a wakeup-mode during predetermined time periods, during which mode communication with the network element is possible, and otherwise be in a sleep-mode, where the sleep-mode time periods are longer than wakeup-mode periods; send the network element a message after entering wake-up mode; receive one or more requests from the network element; and send responses to the network element.

A fourth disclosed embodiment provides a method comprising communicating with end-points using a binary web service using a first interface, the end-points comprising one or more resources, receiving using the first interface from an end-point a registration comprising information on the address and the resources of the node, and whether the end-point is non-continuously available; receiving using a second interface requests regarding the resources and for responding to the requests; storing information on end-points which are continuously available and on sleeping end-points which are non-continuously available and storing a request queue for each sleeping end-point; receiving through the second interface a request regarding a sleeping end-point, adding the request to the request queue of the end-point; communicating with a sleeping end-point regarding the requests after receiving through the first interface a message from the end-point; and sending through the second interface responses for the resolved requests.

A fifth disclosed embodiment provides a method comprising communicating with a network element using a binary web service, entering a wakeup-mode during predetermined time periods, during which mode communication with the network element is possible, and otherwise being in a sleep-mode, where the sleep-mode time periods are longer than wakeup-mode periods; sending the network element a message after entering wake-up mode; receiving one or more requests from the network element; and sending responses to the network element.

A sixth disclosed embodiment provides a computer program product encoding a computer program of instructions for executing a computer process carrying out the method comprising steps of communicating with end-points using a binary web service using a first interface, the end-points comprising one or more resources, receiving using the first interface from an end-point a registration comprising information on the address and the resources of the node, and whether the end-point is non-continuously available; receiving using a second interface requests regarding the resources and for responding to the requests; storing information on end-points which are continuously available and on sleeping end-points which are non-continuously available and storing a request queue for each sleeping end-point; receiving through the second interface a request regarding a sleeping end-point, adding the request to the request queue of the end-point; communicating with a sleeping end-point regarding the requests after receiving through the first interface a message from the end-point; and sending through the second interface responses for the resolved requests.

The following disclosed embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Data exchange between programs and computers is a vital element. Different programs, computers and processors may exchange data without human intervention. Different networks and protocols are used in different environments. On the Internet, the Transmission Control Protocol/Internet Protocol (TCP/IP) is the basic protocol used in communication. TCP/IP takes care of assembling and disassembling the data to be transmitted in packets. IP handles the addressing so that packets are delivered to the correct destination. Above TCP/IP, the Hypertext Transfer Protocol (HTTP) is used as a client/server protocol. A program may send an HTTP request to a server which responds with another HTTP message.

The exchanges of interoperable messages using APIs (Application Program Interfaces) provided by servers on the Internet are realized by using web services. A web service can be realized in many ways, usually by using a REST (Representational State Transfer) design with the built-in features of a web protocol like HTTP and payload encoding with Extensible Markup Language (XML), or realized as a remote procedure call via SOAP (Simple Object Access Protocol).

Low-power wireless networks, such as IEEE 802.15.4 based embedded and sensor networks, have extremely limited resources for transmitting packets. These networks are very energy-efficient, and the chip technology is cheap. For this reason the technology is making its way to embedded devices very quickly for automation, measurement, tracking and control, for example.

In low-power wireless networks, current web service technologies are far too complex (headers, content parsing) and heavy (large header and content overhead). Recently, binary web service protocols have been developed for low-power wireless networks. A binary web service solution includes the use of a suitable web service protocol (such as simplified HTTP or a binary web service protocol such as Constrained Application Protocol CoAP) and an efficient content encoding (such as Efficient XML Interchange EXI, Binary XML or Fast Infoset FI).

FIG. 1 illustrates an example of a web service system architecture to which disclosed embodiments may be applied. In at least one disclosed embodiment, the system is configured to efficiently enable one or more backend web applications 120 to make use of constrained embedded end-points or nodes 108 over constrained networks 110. The communication is based on IP and a RESTful web service architecture end-to-end. Furthermore, unlike prior art systems that use full web services end-to-end, the proposed system is more efficient and scalable—also being applicable to a much wider range of devices and networks at a lower cost and batter consumption.

The architecture consists of a server 104, which hosts backend components of the system. Such a server can be realized on anything from a standard personal computer (PC) to a server cloud. The server components can be located on the same apparatus, or distributed across a cluster. Disclosed embodiments are designed to scale from small M2M systems (1000 s of nodes) to very large M2M systems (100 s of millions of nodes).

The server 104 provides a web service interface to web applications 120 that make use of embedded end-point resources. The web application may be application run in a browser or in standalone software. The application or software may be run in an apparatus capable of Internet communication. The server is configured to communicate using optimized embedded web service algorithms and protocols with local proxy components 106 or directly with nodes 108 over the M2M interface 112. In at least one disclosed embodiment, the functions of this interface include registration, events, subscription and resource requests. The architecture includes the ability to cluster the backend server across multiple physical or virtual machines (called private or public cloud computing).

In at least one disclosed embodiment, a local proxy component 106 may be utilized to distribute parts of the intelligence of the server to the edges of the architecture. Thus this component has a subset of the server functionality, and from the point of view of end-points 108 in a local constrained network 114 the local proxy looks identical to the server. An M2M interface to the server 112 and an M2M interface to the end-points 114 are used. The local proxy provides discovery, proxy registration, local lookup, subscription aggregation and resource caching services to the end-points using it. There may be any number of local proxies associated with one or more servers.

The constrained end-points or nodes 108 in the system have limited memory and processing capabilities, may sleep most of the time, and often operate using a constrained network technology 110. End-points communicate with local proxies or servers using an M2M interface 114. Each end-point contains resource registration, eventing and subscription related functionality. The end-points comprise one or more resources which may be utilized by the web applications.

The embedded M2M devices, end-points or nodes 108 that are being managed by the NMS server 104 can be connected to the server via IP either directly or via the proxy 106. The interfaces between the end-point, proxy and server 112, 114 are realized using a binary web service protocol over IP. In at least one disclosed embodiment, the intermediate proxy 106 may help in the registration process, provide extra security, and do intermediate web resource caching on behalf of end-points. The M2M devices 108 reside in a constrained network 110 over which traditional management protocols would be too inefficient. The constrained or low-power wireless network may be a multihop network comprising a set of wireless low-power end-points. In this simplified example, one end-point 108 is illustrated.

In at least one disclosed embodiment, the wireless links in the wireless network 110 may be realized by using IEEE 802.15.4, with Internet Protocol v6 (6lowpan), IEEE 802.15.4 with ZigBee, Bluetooth or Bluetooth Ultra Low Power (ULP), Low Power Wireless Local Area Network, proprietary low-power radio, cellular radio system or any other system suitable for low-power transmission. IEEE stands for the Institute of Electrical and Electronics Engineers.

Figure 2:
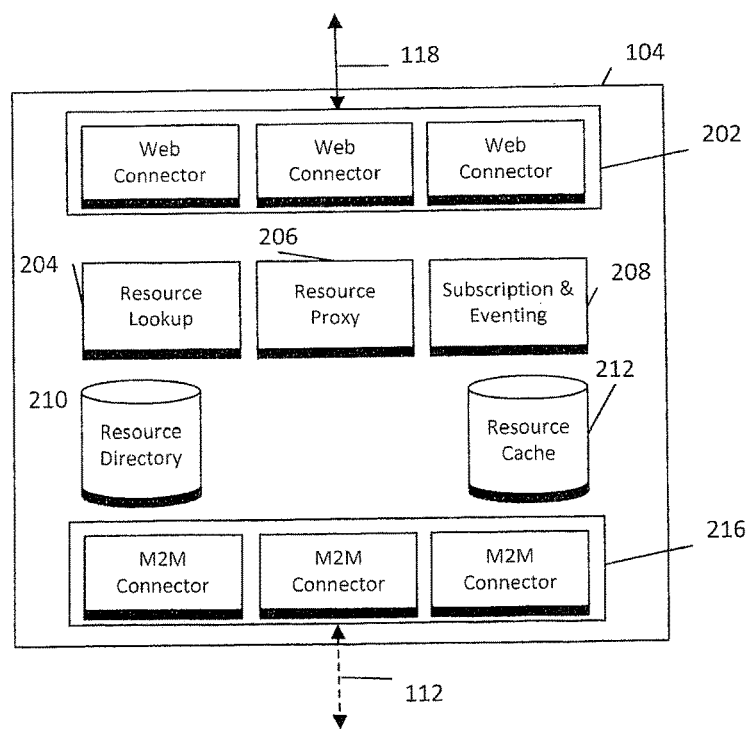
FIG. 2 illustrates an example of a server.

FIG. 2 illustrates an example of a server 104. The server may consist of several components. The server may be used by one or more web applications 120 over a web interface 118. The interface 118 is typically realized over HTTP with XML or JSON payload content where JSON (JavaScript Object Notation) is a known data-interchange format. Mentioned realizations are merely examples as the architecture of the server is transparent to payload type. Interaction of the web applications with the server over the interface uses the REST paradigm. Alternative protocols may be supported, e.g. JMS (Java Message Service) for communication with enterprise Java components, or CoAP when efficiency is needed e.g. when communicating with mobile devices. The server may comprise a Web Connector 202 for each protocol supported by the interface. The Web Connectors realize abstract REST interfaces used by the other server components to access the different protocols available. This makes it possible for to support a new protocol without changing other server components.

The communication with local proxies 106 or constrained end-points 108 are realized in the server using an M2M interface, realized using embedded web services (binary web protocol and payload) for example with the CoAP protocol. Other protocols such as SMS or optimized HTTP are also supported. Each protocol is realized in the server using an M2M Connector 216.

The server further comprises a Resource Directory 210. The server is configured to receive registrations of constrained nodes or end-points 108 operationally connected to the server. The end-points and their web resources (path) along with other meta-data are registered with the Resource Directory either directly by the end-point, via a local proxy or by another third party. Thus, the Resource Directory is a registry of the resources below the server in the M2M network. This way the Resource Directory eliminates the need for management tools to probe the M2M network directly (which is very inefficient). The Resource Directory may be realized using a processor and a storing device such as a hard disc drive and a suitable application, for example. The Resource Directory may be realized as a database application in a computer or it may be realized using cloud computing.

The server further comprises a Resource Cache 212. The Resource Cache is a temporary cache of the most recent representation (latest payload value) of end-point resources. The cache 212 is accessed any time the server receives a request for a resource. The cache is updated any time a response is made or a notification as a result of a subscription is received. This caching greatly improves efficiency as subsequent requests for that resource are fetched internally rather than loading the constrained M2M network. The Resource Cache may be realized using a processor and a storing device such as a hard disc drive and a suitable application, for example. The Resource Cache may be realized as an application in a computer or it may be realized using cloud computing.

In at least one disclosed embodiment, the server comprises a Resource Lookup 204 which is configured to provide a lookup interface for web applications 120 and other internal components to discover end-points and resources. A web application or internal component may send a lookup request to the server and the Resource Lookup 204 is configured to handle these requests and reply with necessary information. With the knowledge of the domain, the end-point and a resource a web application or internal component can make a resource request. These requests are handled by a Resource Proxy 206 and the Resource Cache 212. The Resource Proxy is first configured to check if a local cached copy of the requested resource is available. If a valid copy is found, it may be sent as a reply. If the cache does not have a copy of the resource it is requested from the end-point via an M2M Connector 216. The Resource Lookup and Resource Proxy may be realized using a processor and a storing device such as a hard disc drive and a suitable application, for example. They may be realized as applications in a computer or using cloud computing.

In at least one disclosed embodiment, the server supports a push interaction model and context awareness via the Subscription & Eventing component 208. Events can be generated by any end-point and sent to a server using an event name, which is received by this component. Likewise, web applications and other internal components can make subscriptions for resources. Any time the subscribed resource changes on an end-point, a notification is sent to the Subscription & Eventing component. The results of events and notifications are sent to subscribing entities which may be Web applications or internal components. The subscription and event procedures are described in detail below.

In at least one disclosed embodiment, resources to be managed on an end-point are represented as web resources. Resources of the end-points may be defined as Uniform Resource Identifier web resource structure. A web resource is identified by a Uniform Resource Locator (URL). A Uniform Resource Locator is a Uniform Resource Identifier (URI) that specifies where a resource is available and the mechanism for retrieving the resource. An example of an URL is the address of a web page on the World Wide Web, such as http://www.example.com/.

Figure 3:
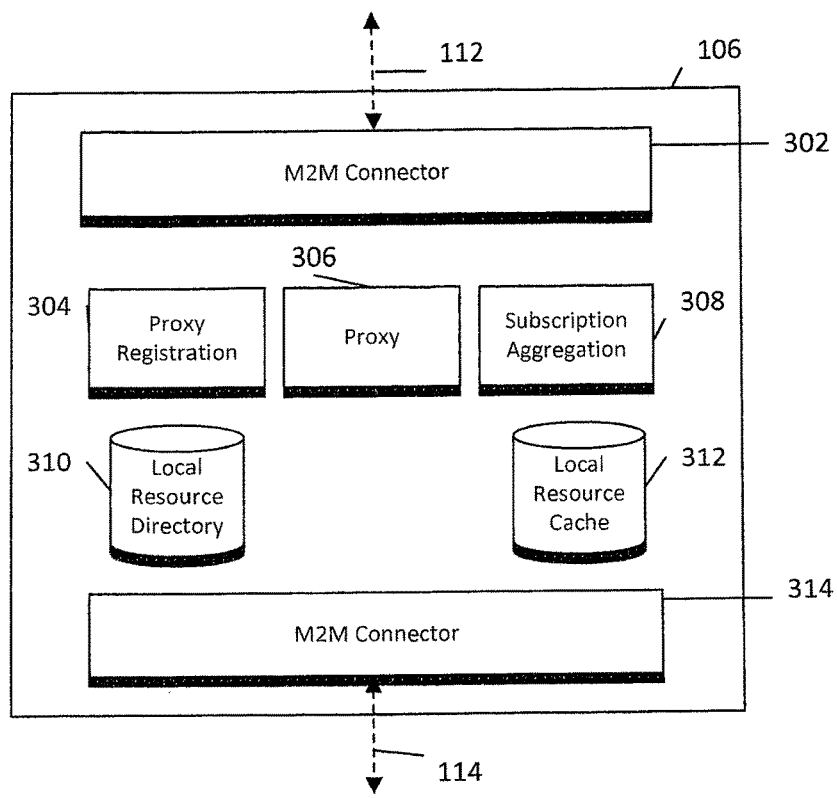
FIG. 3 illustrates an example of a proxy.

FIG. 3 illustrates an example of the components of a local proxy 106. The purpose of a local proxy is to distribute parts of the server 104 to the edges of the system. The local proxy is typically deployed in an embedded device like a WiFi Access Point. The local proxy has two M2M interfaces 302, 314, first interface 302 for communicating 112 with the server 104 and another 314 for communicating 114 with end-points 108. The proxy comprises a Local Resource Directory 310 configured to accept registrations from end-points 108, and store that information locally. The proxy further comprises a Proxy Registration component 304 configured to make a batch registration of those end-points and their resources with the server 104 for efficiency. If a registration is updated or removed by an end-point, that is also updated with the server by this component.

The proxy comprises a Local Resource Directory 310 configured to provide a discovery service, so that local end-points can find the correct local proxy, and a lookup service, so end-points can discover resource of other local end-points for peer-to-peer communications without loading the system. In these operations incurs no load on connection 112 to the server.

The Resource Proxy component 306 of the proxy accepts incoming requests for resources from the server and attempts to respond using information stored in the Local Resource Cache 312 of the proxy. If requested resource data is not cached, the resources are requested using the M2M interface 314 and valid responses received from the end-points are cached for future use in the Local Resource Cache 312.

In at least one disclosed embodiment, the proxy comprises a Subscription Aggregation component 308 which shields constrained end-points from the need to handle multiple subscriptions for the same resource, for example when multiple servers use the same local proxy. The component 308 handles all the subscription for resources of end-points registered to it, and subscribes to the resources. When multiple subscriptions for the same resource are made, it sends only a single subscription to the actual resources, and then makes the multiple notifications made. This component can also handle the execution of batch subscriptions.

Figure 4:
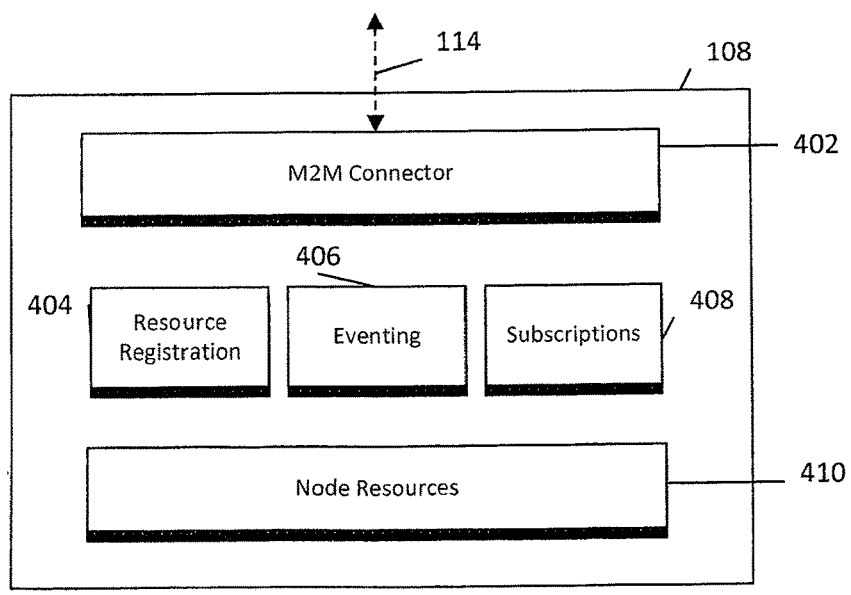
FIG. 4 illustrates an example of an end-point.

FIG. 4 shows an example of the structure of an end-point or node 108. An end-point has one or more device applications, each registering resources with the Node Resources component 410. When the resources have been registered, the Resource Registration component 404 discovers the location of a Resource Directory for its appropriate domain (either a local proxy or a server) and then registers itself and its resource over the M2M interface 114 using the M2M Connector 402. Device applications can send events to event names using the Eventing component 406. Finally, the Subscriptions component 408 is configured to accept incoming subscriptions for resources, and then manage the sending of notifications to subscribers by interacting with the device applications each time a resource changes.

An end-point or end-points may have resources of different types registered. A basic type of resource is one which may have a given value. A web application may request the end-point the value, the value is read and reported back to the web application typically immediately after receiving the request. An observable resource is a resource on an end-point that supports a special observation feature. The observation feature allows asynchronous notifications to be sent from the end-point to the server each time the resource changes.

Following, a term delayed request is used. When a web application 120 sends a request to the server 104 and it does not expect and receive response in a predicable time slot, the request may be denoted as a delayed request. What is more, a response is not even guaranteed and might never come. However, a web application can set time-out for the request. In such a case a response is guaranteed. The application may receive at least a time-out response from the server. Due to a nature of HTTP protocol, resource response is coming through long polling pipe.

An end-point may be configured to be non-continuously available. For example, an end-point may be in a sleep-mode for the most of the time and enter a wakeup-mode during predetermined time periods, during which mode communication with the network element is possible. This kind of operation conserves operation power in a great manner. These end-points may be called sleeping end-points. However, accessing the end-point resources is more challenging. Regular communication with such an end-point ends up with undelivered messages which means low probability of a success. In addition, constrained network is filled with extra traffic. Therefore another approach is required.

In at least one disclosed embodiment, the end-points that are non-continuously available inform the system of this property when the end-points register themselves to the system. In at least one disclosed embodiment, each end-point is configured to send the system a registration message upon installation or when some parameter of the end-point change. The registration message is received by the server 104 and possible proxy 106. In case of a sleeping end-point, the end-point may, for example, add a query parameter: "type=sleeping" to the registration message.

Web applications 120 may send resource requests to the server 104 with an end-point address. In at least one disclosed embodiment, the request contains information that request is directed to a sleeping end-point; i.e. the request is a delayed request. In addition, the application may set a time-out for the request. For example, the application may add query parameters: "proxy=delayed" and "timeout= {number of seconds}" to the request. Time-out parameter is not mandatory and the server 104 may decide a default value for the time-out. The server is configured to store the received request to a request queue and immediately send a response with a proper response code to the application.

Figure 5:
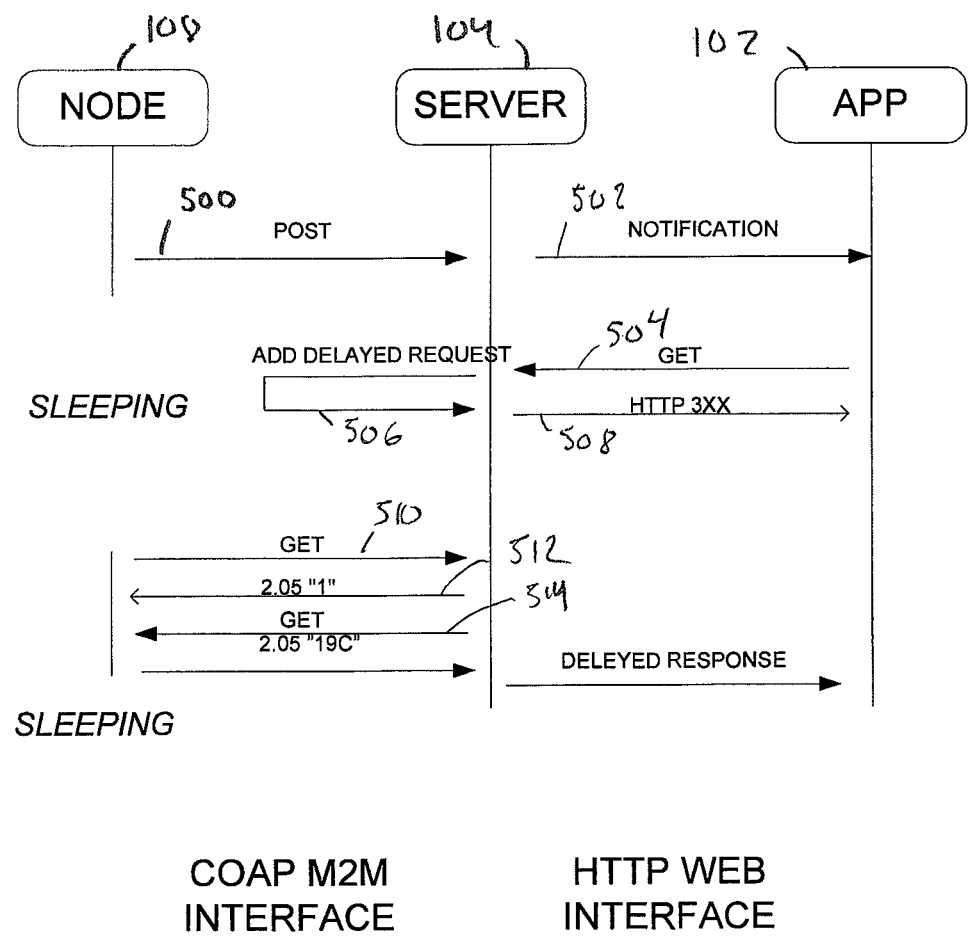
FIG. 5 shows an example of a message exchange diagram for accessing a sleeping end-point.

The message diagram of FIG. 5 illustrates an example of the communication between a web application 102, the server 104 and an end-point 108. The message examples below are merely illustrative examples of possible messages. In this example the web application 102 and the server 104 communicate using an HTTP web interface and the server and the end-point communicate through a CoAP M2M interface.

In this example, the network element communicating with the end-point and keeping a request queue of a sleeping end-point is a server. However, the network element might as well be a proxy 106. In such a case the server merely passes the messages directed to an end-point to the proxy which does all the processing. Thus, all actions below performed by the server could be performed by a proxy as well instead of the server.

First an end-point 108 registers itself by sending a registration message 500 to the server 104. The registration message may of the form POST/rd?h=node02&type=sleeping "</s/temp>,</s/power>", which indicates that the end-point name is node02, the end-point is a sleeping end-point, comprises two resources, one for temperature and one for power.

The server receives the message and stores the received information into Resource Directory. The server may send a notification 502 to web applications regarding the end-point.

In this example, the end-point enters sleep-mode after sending the registration message.

A web application 102 may send a request 504 to the server 104 regarding a resource of the end-point. The request may be of the form GET node02/s/temp?proxy=delayed which indicates that the application requests temperature information from an end-point which is known to be non-continuously available, i.e. a sleeping end-point.

In at least one disclosed embodiment, when the server receives a request regarding a sleeping end-point, the server is configured to determine if the request comprises information that the end-point is a sleeping end-point; and process the request only if the information is found. If the request does not comprises the information a negative acknowledgement is sent to the application. This ensures that the applications requesting information from sleeping end-points are aware that an immediate response from the end-point is not necessarily available. In at least one disclosed embodiment, if a valid resource value for the sleeping end-point resource can be found in the resource cache, the cached value is sent as a response to the request lacking the above mentioned information instead of a negative acknowledgement.

When the server receives a valid request related to a sleeping end-point, it is configured to add 506 the received request to the request queue of the end-point. An acknowledgement 508 may be sent to the web application.

The server is configured to add all valid received requests regarding a sleeping end-point to the request queue of the end-point while the end-point is unavailable.

When the end-point enters a wakeup-mode, it is configured to send the server a message 510 requesting possible resource requests. This may be any message, for example a normal data notification, a registration update or outgoing request. In at least one disclosed embodiment, the end-point first queries the server how many requests there are in the request queue of the end-point. Furthermore, the end-point may include in the query the number of requests the apparatus is able to handle during the wakeup-mode. The query may be of the form GET/queue/node02?n=1 where the end-point indicates that it may process one request during this wakeup-mode. The benefit of this mechanism is that it allows the node to immediately go back to sleep when it has received the indicated number of messages (and thus save energy or bandwidth). When the server sends queued messages based on other traffic from the sleeping node, the node uses a timeout from the last message received from the server before going back to sleep. This timeout results in longer on duty cycles for a sleeping node.

The server first transmits the end-point information 512 that in this case there is one request in the request queue. Then it sends the request 514 to the end-point. In general, the server is configured to send at most as many requests to the end-point that the end-point can handle during the wakeup-period. In this example, the request 514 may be of the form GET/s/temp The end-point is configured to process the request or requests and send a response 516 with the requested resource value.

The server, after receiving the response from the end-point, is configured to send a delayed response 518 to the web application.

Figure 6:
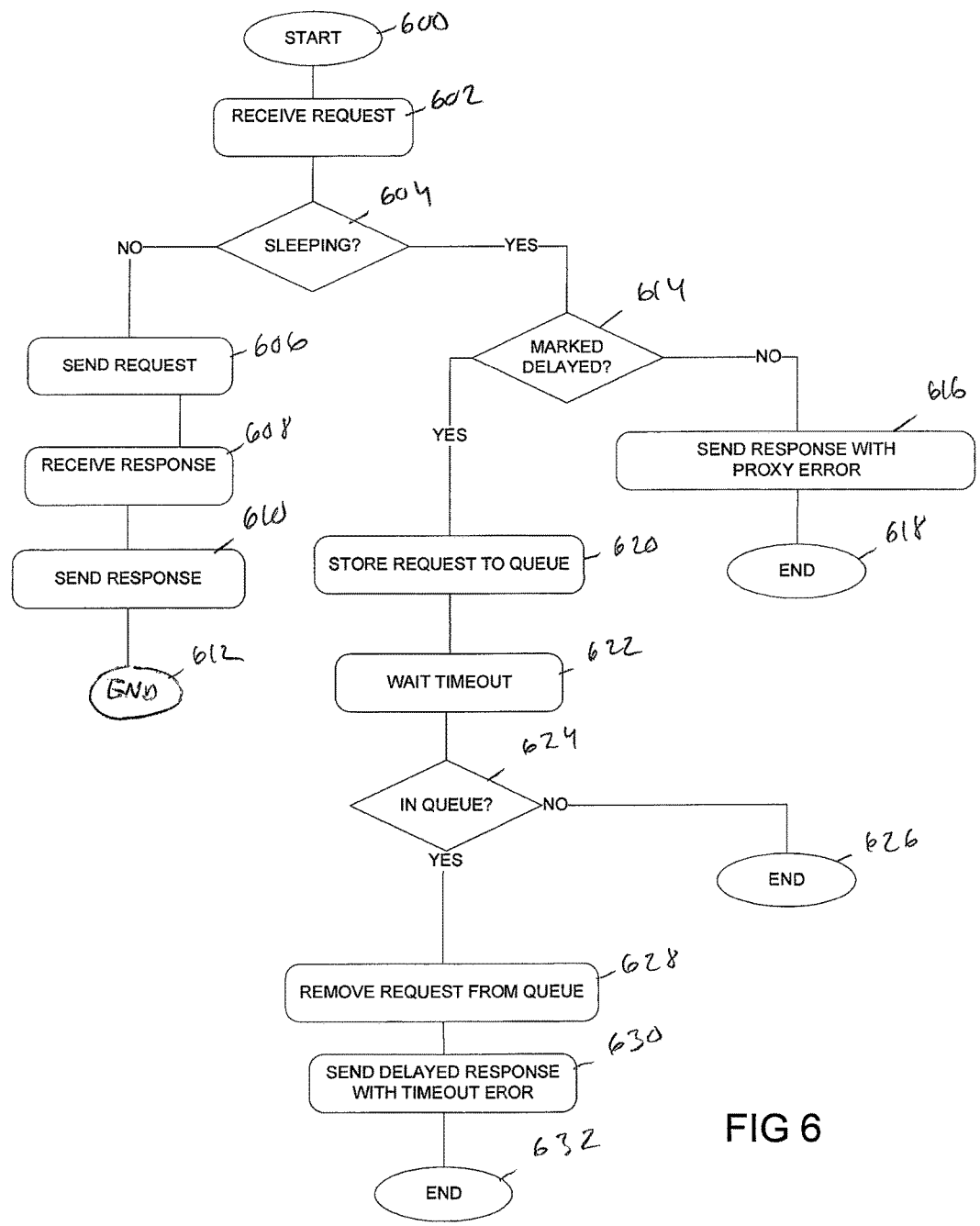
FIGS. 6 and 7 are flow charts illustrating the operation of a network element.

FIG. 6 is a flow chart illustrating the operation of the server or the proxy. Below, the term server is used for simplicity. The process starts in step 600.

In step 602, the server receives a resource request from a web application.

In step 604 the server checks is the request related to a sleeping end-point.

If the request is related to a non-sleeping end-point which is continuously available, the process continues in step 606 by sending the request to the end-point.

In step 608, a response to the request is received from the end-point.

In step 610, the server sends the response to the web application 102 and the process ends in step 612.

If it was determined in step 604 that the request relates to a sleeping end-point, the process continues in step 614 where the server checks whether the request comprises information that the end-point is a sleeping node, i.e. the request is a delayed request.

If not, the server sends the web application a response with an error message in step 616 and the process ends in step 618.

If yes, the server is configured to store the request to the request queue of the end-point in step 620.

The request may comprise a time-out defined by the web application. In lack of a web application defined time-out parameter the server may select a default time-out value.

In step 622 the server waits for the time-out to pass.

In step 624, the server is configured to check whether the request is still in the queue. If yes, the server removes the request from the queue in step 628.

In step 630, the server sends a delayed response to the web application where the response comprises a time-out error indication. The process ends in step 632.

If the request was not in the queue, it has been processed and the process ends in step 626.

When a sleeping end-point enters a wakeup-mode, it is configured to pull queued requests from the server by sending a request to the server. In at least one disclosed embodiment, the request comprises information on how many queued requests the server can send to the end-point. This can be realized by adding query parameter "n={maximum number of requests}" to the request, for example. If this parameter is missing, default one may be used which must be at least one. When the server receives request from the end-point it is configured to response with the number of waiting requests to the end-point. Next, the server sends at most the specified number of request messages to the end-point. The number of messages might be less than what was specified by a node. The request are sent in the order the server received them from the web applications. In at least one disclosed embodiment, the requests may have different priorities and in such cases high priority requests are sent first. If the server will not receive acknowledgement from the end-point for a request the request in question stays in the request queue and will be used next time. When the server receives an acknowledgement for a request, it removes matching request from the request queue and sends a proper delayed response message to a web application.

Figure 7:
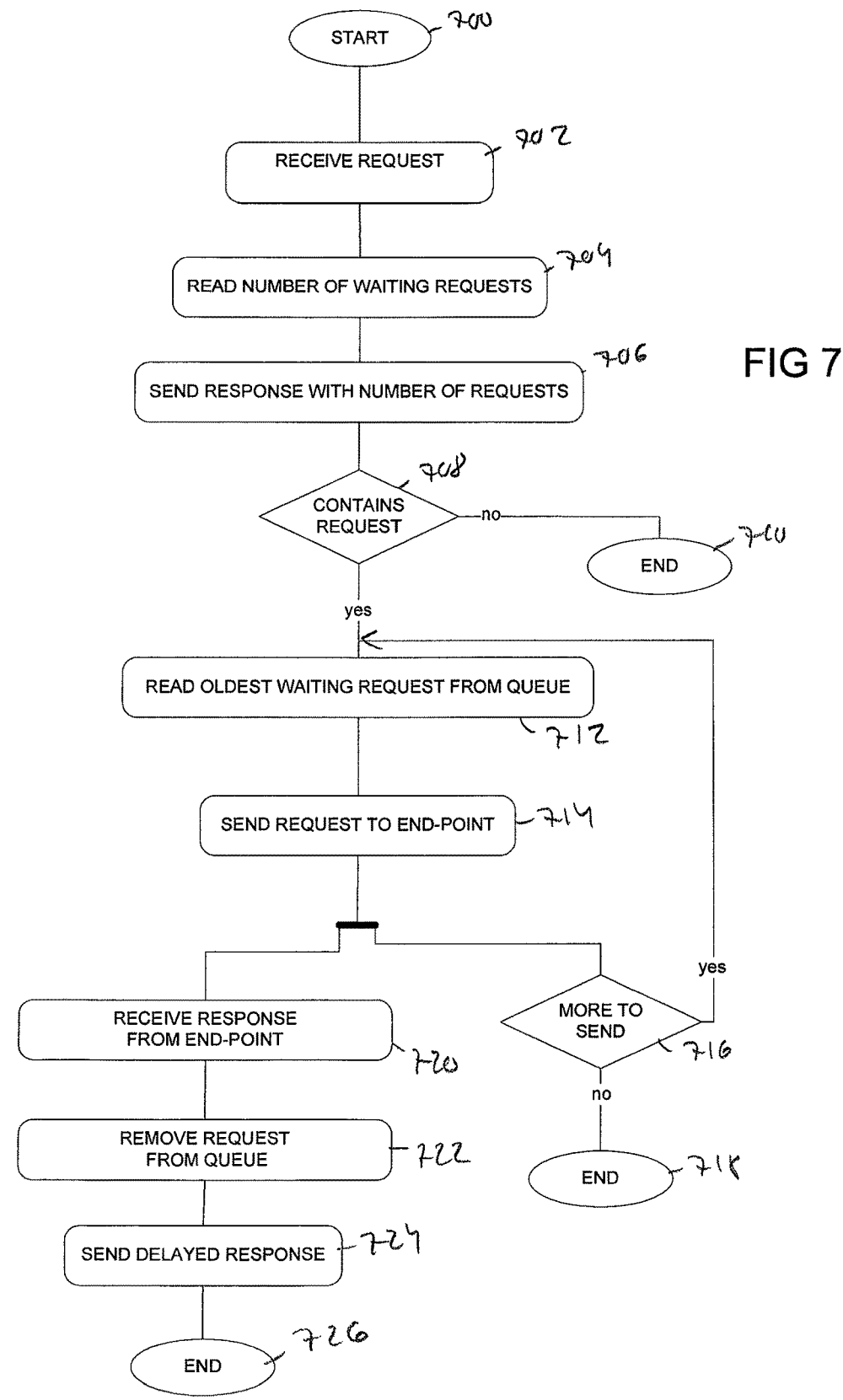

FIG. 7 is another flow chart illustrating the above operation of the server or the proxy. Below, the term server is used for simplicity. The process starts in step 700.

In step 702, the server receives a request from an end-point that has entered a wakeup-mode. The request may be of the form GET/queue/{node}?n={max req} where the end-point indicates that it may process {max req} number of requests during this wakeup-mode.

In step 704 the server reads the number of waiting requests in the request queue of the end-point.

In step 706, the server sends the end-point a response with the number of waiting requests. If there a no requests pending the number may be zero.

In step 708, the server makes a decision on the basis of the number of the request in the queue. If there are no requests in the queue, the process ends in step 710.

If there are requests in the queue, the server is configured to read the oldest request in the queue.

In step 714, the request is sent to the end-point.

Next, the process continues in two branches.

In the first branch, the server determines in step 716 whether there are more pending requests in the queue. If not, the process ends in step 718.

If there are requests in the queue, the process continues in step 712.

In the second branch, the server receives a response for the request from the end-point in step 720.

In step 722, the server removes the request from the queue.

In step 724, the server sends a proper delayed response message to the web application which sent the request.

The process ends in step 726.

In at least one disclosed embodiment, the sleeping end-points support subscription procedure. In subscription, a server makes a special observe request, which results in an end-point to server notification each time the resource changes.

As mentioned above, the end-points 108 of the system are configured to register their end-points and resources with the Resource Directory either directly with the server 104 or via the proxy 106. In the registration message the end-points may indicate the resources supporting subscription with a suitable attribute.

Figure 8:
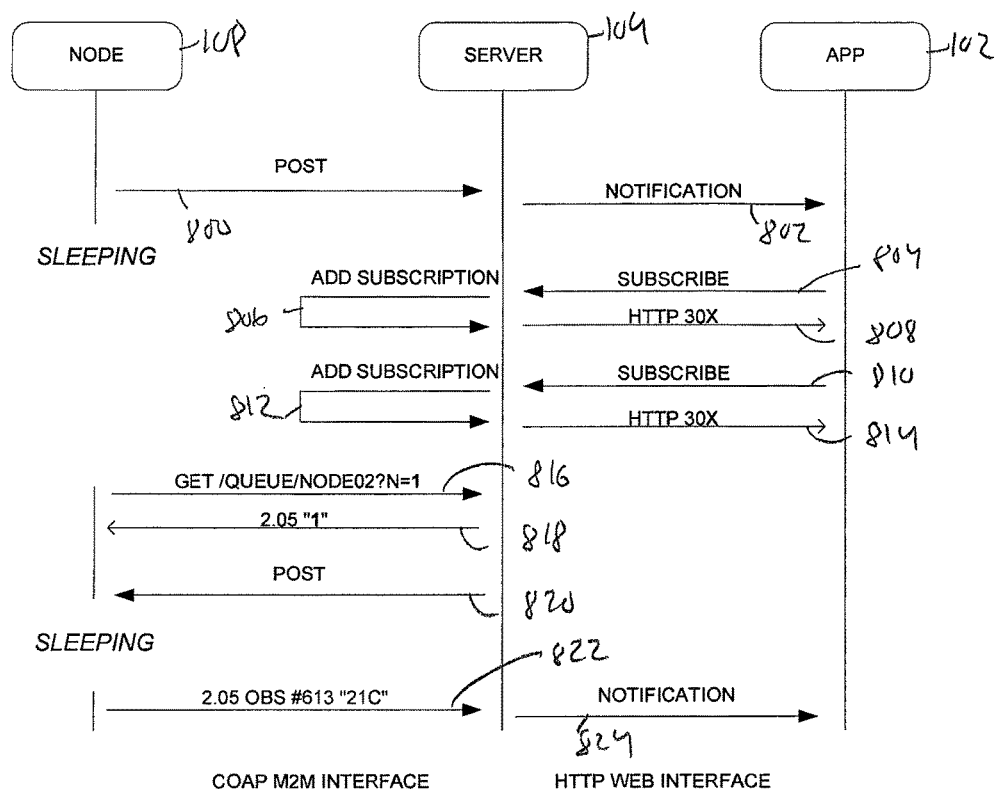
FIG. 8 illustrates an example of a message exchange diagram for making subscriptions.

Making subscriptions is illustrated in the message diagram of FIG. 8. First, the end-point performs registration by sending a message 800 to the server. The message may be of the form POST/rd?h=node02&type=sleeping "</s/temp>;obs,</s/power>;obs,<sub>"

The "obs" attribute indicates that the resources temp and power are observable resources. The sleeping tag indicates that the end-point is a sleeping end-point.

The server receives the message and stores the received information into Resource Directory. The server may send a notification 802 to web applications regarding the end-point.

In this example, the end-point enters sleep-mode after sending the registration message.

A web application 102 may send a subscription request 804 to the server 104 regarding a resource of the end-point. The request may of the form Subscribe to node02/s/temp The subscription is to the temp resource of the end-point.

The server is configured to add the subscription 806 in a database and send acknowledgement 808 to the web application.

In a similar manner, the web application 102 may send a subscription request 810 to the server 104 regarding a power resource of the end-point. The request may of the form Subscribe to node02/s/power The server is configured to add the subscription 812 in a database and send acknowledgement 814 to the web application.

In at least one disclosed embodiment, batch subscriptions are supported. In such a case the web application may subscribe to more than one resource with a single message.

When the end-point enters wakeup-mode, it sends a request 816 to the server as previously described. In this example, the end-point is able to process only one request per wakeup-mode. The server sends information 818 on pending requests to the end-point and the subscription information in the next message 820. The message may comprise both subscriptions.

The end-point is able to process the first subscription, i.e. subscription to the temp resource. It sends a response 822 to the server which in turn sends 824 a notification regarding the changes resource to the web application.

In at least one disclosed embodiment, the server can also limit some requests if they resolve to same result as subscription. If a delayed request points to the same resource as an ongoing subscription then the server do not have to send it directly to the end-point. It can just wait for a notification and send a response to the application. This procedure will save traffic in the end-point network.

In at least one disclosed embodiment, the apparatus implementing aspects may be realized as software in a node, a server, a computer or a set of computers connected to Internet and a binary web service domain directly or via a proxy router or server.

The computer programs may be in source code form, object code form, or in some intermediate form, and it may be stored in some sort of carrier, which may be any entity or device capable of carrying the program. Such carriers include a record medium, computer memory, read-only memory, and software distribution package, for example. Depending on the processing power needed, the computer program may be executed in a single electronic digital controller or it may be distributed amongst a number of controllers.

In at least one disclosed embodiment, the apparatus implementing aspects comprises means for communicating with end-points using a binary web service, the end-points comprising one or more resources; means for receiving requests regarding the resources and for responding to the requests; means for storing information on sleeping end-points which are non-continuously available and storing a request queue for each sleeping end-point; receiving through the second interface a request regarding a sleeping end-point, means for adding the request to the request queue of the end-point; communicating with a sleeping end-point regarding the requests after receiving through the first interface a queue request from the end-point; and means for sending through the first interface responses for the resolved requests.

It will be obvious to a person skilled in the art that, as technology advances, the disclosed embodiments can be implemented in various ways. The invention and its embodiments are not limited to the examples described above but may vary within the scope of the claims.

The invention claimed is:

1. An apparatus, comprising:
a memory;
a processor coupled to the memory;
a first interface to communicate with non-continuously available end-points operationally connected to the apparatus, the non-continuously available end-points comprising a wakeup-mode and a sleep-mode, the first interface being configured to receive information from the non-continuously available end-points;
a second interface for receiving requests regarding the non-continuously available end-points and for responding to the requests;
a first component for
storing a request queue for each non-continuously available end-point; and
a second component for:
receiving, through the second interface, one or more requests regarding a non-continuously available end-point,
adding the one or more requests to the request queue of the non-continuously available end-point,
communicating with the non-continuously available end-point regarding the one or more requests only after receiving, through the first interface, information that the non-continuously available end-point is in the wakeup-mode and an indication of the number of requests the end-point is able to process during the wake-up mode and
sending, through the second interface, responses for the requests;
wherein the first component and the second component are stored in the memory and executed by the processor.

2. The apparatus as claimed in claim 1 wherein the second component further determines whether the request is a delayed request.

3. The apparatus as claimed in claim 2 wherein if the request is not a delayed request, the second component sends, through the second interface, an error message in response to the request.

4. The apparatus as claimed in claim 2 wherein if the request is a delayed request, the second component adds the request to the request queue of the non-continuously available end-point.

5. The apparatus as claimed in claim 1 wherein the information received by the first interface from the non-continuously available end-points operationally connected to the apparatus comprises:
an address of each of the non-continuously available end-points, and
information on each resource of each of the non-continuously available end-points, wherein the apparatus further comprises:
a resource directory to store the received information about each non-continuously available end-point.

6. The apparatus as claimed in claim 1 further comprising a resource cache for storing a value for each resource of each non-continuously available end-point operationally connected to the apparatus.

7. The apparatus as claimed in claim 6 wherein the second component further determines whether the request is a delayed request, and if the request is a delayed request, the second component:
determines, from the request, a resource of a non-continuously available end-point for which information is requested;
retrieves, responsive to the request, a stored value for the resource from the resource cache; and
sends, through the second interface, the retrieved stored value as a response to the received request.

8. The apparatus as claimed in claim 6 wherein the first interface:
receives updated values for each resource of each the non-continuously available end-point; and
sends the updated value to the resource cache to be stored.

9. The apparatus as claimed in claim 1 wherein the first component and second component are distributed across a cluster.

10. An end-point, comprising:
a memory;
a processor coupled to the memory;
an interface to communicate with a server operationally connected to the end-point, the interface being configured to send and receive information to and from the server;
a first component for storing an availability mode, the availability mode comprising a wake-up mode and a sleep mode; and
a second component for:
sending, through the interface, a registration comprising information that the end-point is non-continuously available,
receiving, through the interface, one or more requests from the server only after sending, through the interface, a message comprising information that the availability mode is the wake-up mode, wherein the message further comprises an indication of the number of requests the end-point is able to process during the wake-up mode,
communicating with the server regarding the one or more requests; and
changing the availability mode to the sleep mode;
wherein the first component and the second component are stored in the memory and executed by the processor.

11. The end-point as claimed in claim 10 wherein when the second component changes the availability mode to wake-up mode, the second component sends, through the interface, a message to the server requesting an indication of the number of resource requests in a request queue of the server.

12. The end-point as claimed in claim 11 wherein the second component receives, through the interface, information from the server indicating the number of resource requests in the request queue of the server.

13. The end-point as claimed in claim 10 wherein the second component receives from the server, through the interface, at most the number of requests the end-point is able to process during the wake-up mode.

14. The end-point as claimed in claim 13 wherein the second component changes the availability mode to sleep mode after the second component has received the indicated number of requests the end-point is able to process during the wake-up mode.

15. A method comprising:
communicating, through a first interface, with non-continuously available end-points, the non-continuously available end-points comprising a wakeup-mode and a sleep-mode, the first interface being configured to receive information from the non-continuously available end-points;
storing a request queue for each non-continuously available end-point;
receiving, through a second interface, one or more requests regarding the non-continuously available end-point;
adding the one or more requests to the request queue of the non-continuously available end-point;
communicating with the non-continuously available end-point regarding the one or more requests only after receiving, through the first interface, information that the non-continuously available end-point is in the wakeup-mode and specifying the number of requests the end-point is able to process during the wake-up mode; and
sending, through the second interface, responses for the requests.

* * * * *